Oct. 28, 1947.   G. B. ANDREWS   2,429,597
ROTATING RADIO BEACON SIMULATOR
Filed Aug. 1, 1944   4 Sheets-Sheet 1

INVENTOR
GILMAN B. ANDREWS
BY
ATTORNEY

Oct. 28, 1947.   G. B. ANDREWS   2,429,597
ROTATING RADIO BEACON SIMULATOR
Filed Aug. 1, 1944   4 Sheets-Sheet 2

INVENTOR
GILMAN B. ANDREWS
BY Paul B. Hunter
ATTORNEY

Oct. 28, 1947.  G. B. ANDREWS  2,429,597
ROTATING RADIO BEACON SIMULATOR
Filed Aug. 1, 1944  4 Sheets-Sheet 3
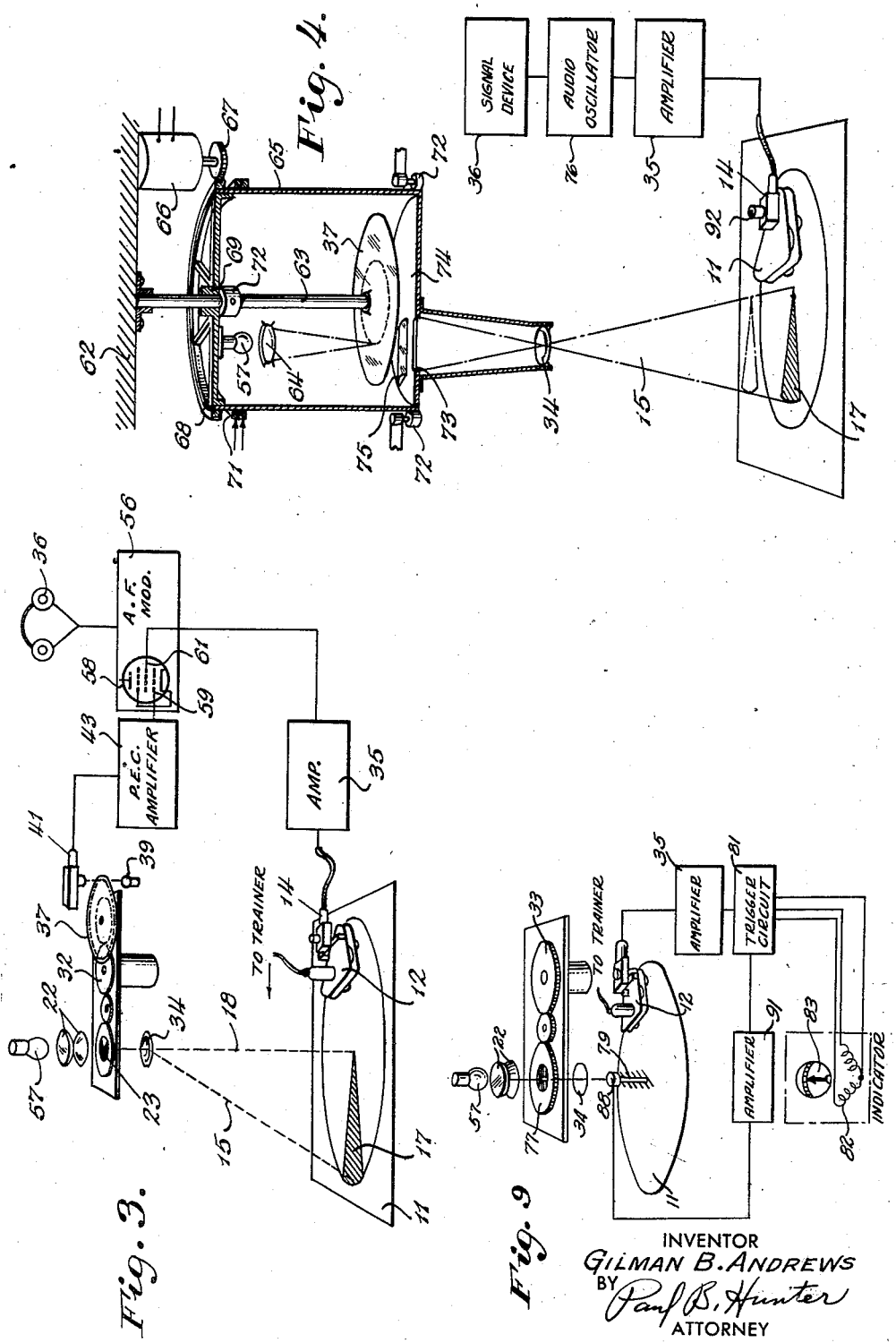
INVENTOR
GILMAN B. ANDREWS
BY
Paul B. Hunter
ATTORNEY Oct. 28, 1947.　　　G. B. ANDREWS　　　2,429,597
ROTATING RADIO BEACON SIMULATOR
Filed Aug. 1, 1944　　　4 Sheets-Sheet 4
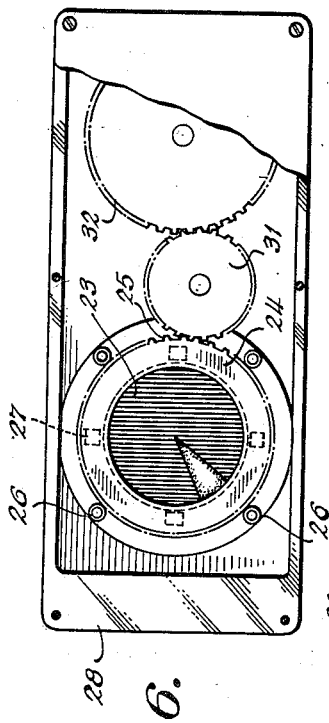
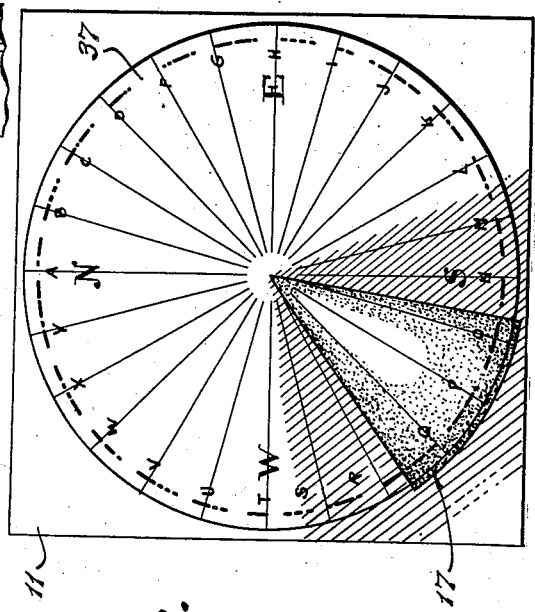
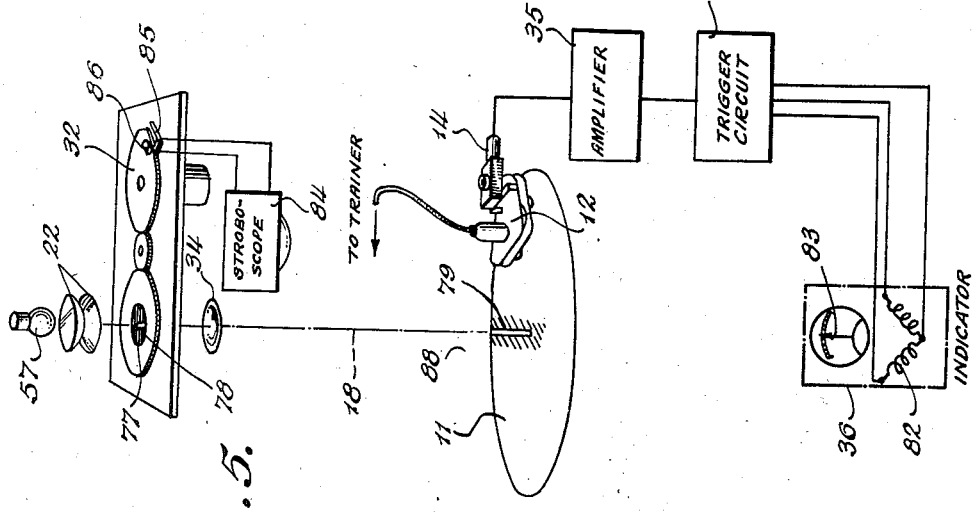
INVENTOR
GILMAN B. ANDREWS
BY
ATTORNEY Patented Oct. 28, 1947

2,429,597

UNITED STATES PATENT OFFICE 2,429,597

ROTATING RADIO BEACON SIMULATOR

Gilman B. Andrews, Hempstead, N. Y., assignor to Sperry Gyroscope Company, Inc., a corporation of New York Application August 1, 1944, Serial No. 547,542

16 Claims. (Cl. 35—110)

This invention relates to navigation systems and more especially to rotating radio beacon system simulators for an aircraft ground trainer.

In various navigation systems, directional information is provided by radiating a lobe of electromagnetic energy into space and rotating the lobe, usually at a uniform angular velocity. The location of a receiving medium relative to the radiator or transmitter may be determined according to a momentary modulation characteristic of the energy, or as a function of the time required for the lobe to travel from a predetermined reference position to a position at which the lobe points toward the receiving medium.

The principal object of the present invention is to provide methods of and apparatus for simulating the functions of such a rotating radio beacon, whereby the principles may be applied to training devices.

Further objects and advantages of the present invention will become apparent from the following description and the accompanying drawings, wherein:

Figs. 3, 4, 5 and 9 are diagrammatic arrangements of modifications of the apparatus shown in Fig. 2;

Figs. 6 and 7 are plan and longitudinal sectional views, respectively, of a rotatable mask which may be used in forming a rotating light pattern; and Fig. 8 is a plan view of a portion of the plotting table graphically illustrating a code arrangement that may be employed to characterize direction, with the light pattern shown in a representative position.

Generally speaking, the invention comprehends forming a rotating light pattern, preferably radiating from a point corresponding to a radio beacon transmitter, and shaped to simulate the intensity pattern of the rotating radio beacon. A positional repeater, adapted to indicate the motion of the simulated craft, is provided with photo-sensitive means responsive to the rotating pattern. An indicator, preferably located in the trainer, is actuated by the photo-sensitive means to provide the trainee with a signal characterizing the instant position of the pattern, and accordingly the simulated position of the craft relative to the transmitter.

The principles of the invention may be utilized in many different ways, representative embodiments being shown in the respective figures of the drawings. Although this system may be employed with any type of craft simulator, it is herein specifically shown as applied in connection with an aircraft ground trainer of well known type, having controls for varying the attitude of the trainer about three mutually perpendicular axes to simulate the motions of an aircraft.

Figure 1:
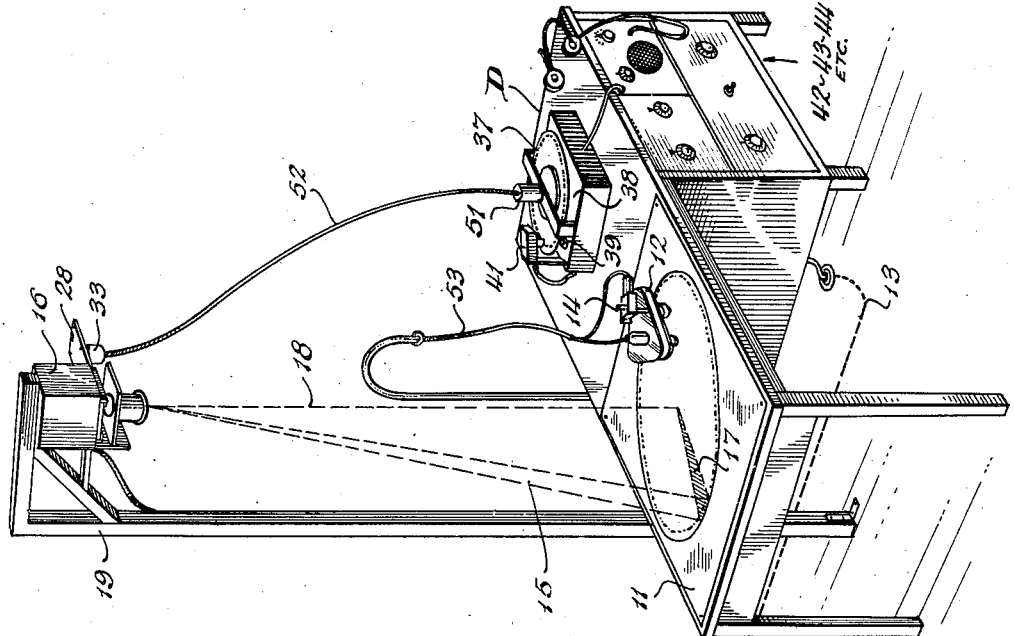
Fig. 1 is a perspective view of an aircraft ground trainer and its associated plotting table upon which is positioned a repeater for indicating the simulated movements of the ground trainer.
Figure 1:
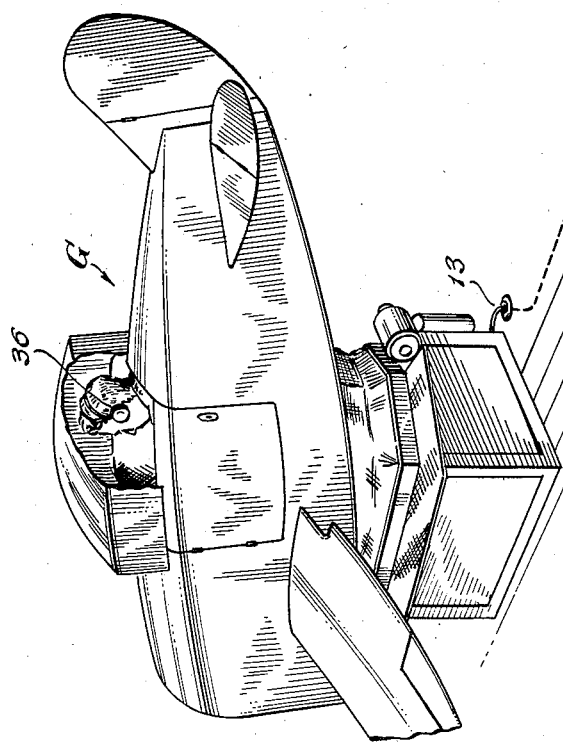
Figure 2:
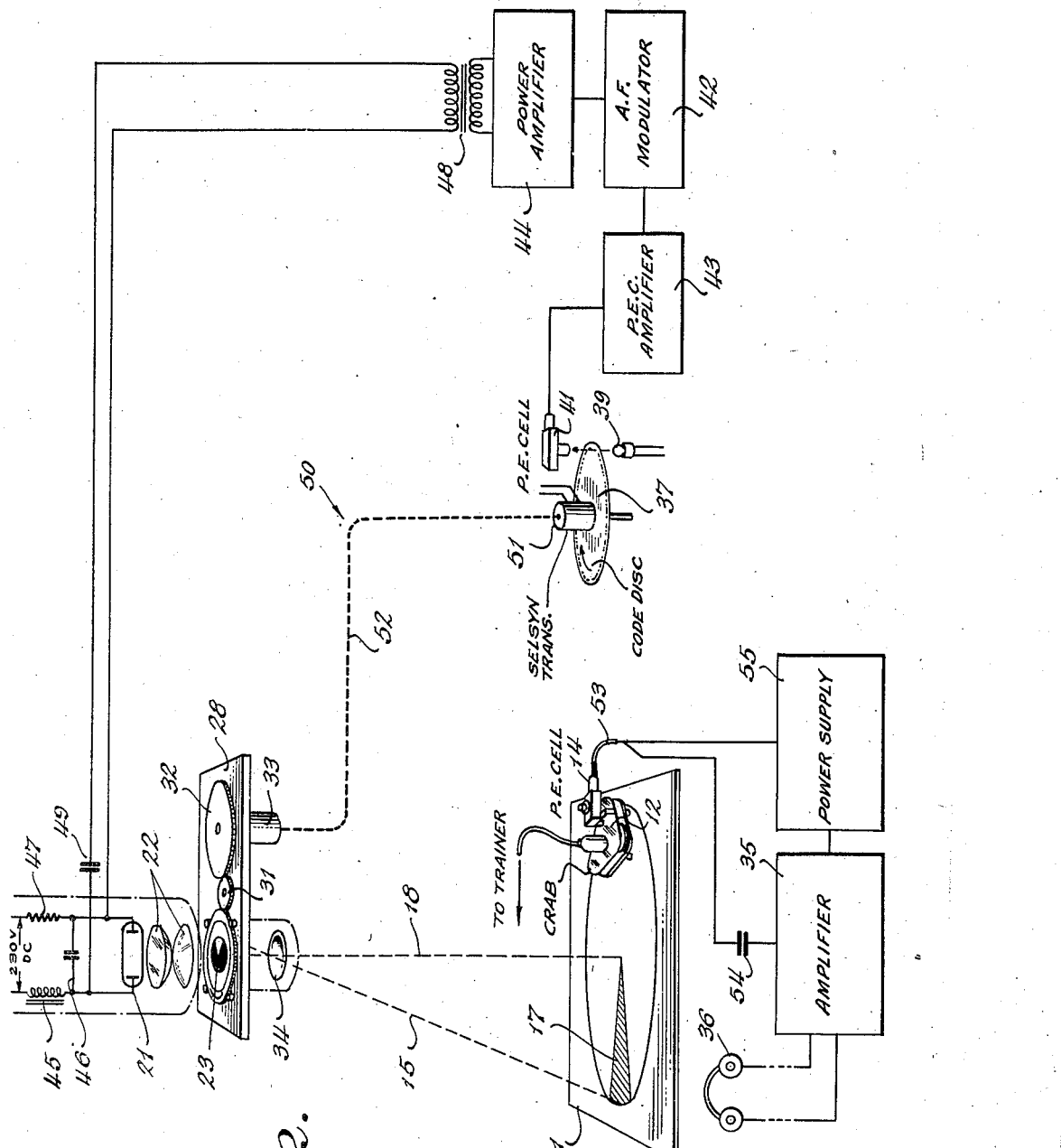
Fig. 2 is a diagrammatic view of a rotating beacon simulator of the type disclosed in Fig. 1.

Referring now to the drawings, and more particularly to Figs. 1 and 2 thereof, the invention is shown in connection with a ground trainer G and an instructor's desk D. The desk D comprises a plotting surface 11 supporting a positional repeater 12 for movement in directions and at speeds regulated by signals transmitted through control cable 13 in accordance with the position of the control elements in the ground trainer G. The repeater 12, trainer G and desk D are all of conventional design and are so well known in the art as to require no detailed description. The equipment may be adapted to train students in rotating radio beacon system techniques by the addition to the standard equipment of a few accessories that impart new functions without disturbing the normal operation of the trainer. The principal additions to the training equipment comprise a photoelectric cell 14 mounted on the positional repeater or "crab" so as to be exposed periodically to a revolving pattern of light 15 formed by a light projector 16. The projector 16 may be positioned beneath the desk D to project light through a transparent plotting surface 11 to form an image on or above the surface or in any region such that the revolving light pattern energizes the cell 14 periodically. Although this may be done by directing light rays in any convenient manner from the pattern onto the photoelectric cell 14, as where the pattern may be formed overhead, Fig. 1 discloses an arrangement that has operated satisfactorily in which the projector 16 is positioned overhead, and is arranged to project the light beam downwardly toward the plotting surface 11. As shown in Figs. 1 and 2, the pattern may comprise a wedge-shaped image 17 that may be made to revolve about an axis 18 whose intersection with the surface 11 represents the position of a radio transmitter from which the simulated rotating radio beacon is presumed to emanate.

The projector 16, which may be secured above the desk D as by a vertical support 19, corresponds roughly in construction and function with a lantern slide projector. As shown in Fig. 2, use may be made of a light source 21 and a pair of condensing lenses 22 for collimating the light into a downwardly directed beam. The beam may be vignetted to form the desired pattern 15, preferably by utilizing a mask 23 that precludes passage of a light beam, save for a transparent sector, the portions of which may vary in opacity to provide an image having a graduated light intensity corresponding to the graduated intensity pattern of the rotating radio beacon. The mask and the means employed for rotating the mask are shown in Figs. 6 and 7.

Successful results have been obtained when the mask was prepared photographically, that is, by photographing a black wedge formed on a light background, the sides of the wedge being shaded to provide transition zones whose tone varies progressively from black to white. By using film and developer that accentuate contrast, the resulting negative comprises a mask that is opaque except for a clear portion at the center of the wedge-shaped sector, with intermediate zones whose opacity diminishes progressively from the center toward the edges. The mask 23 preferably is provided with bearing surfaces at its outer periphery to permit the transparent sector to extend completely to the center of the mask 23 without interference that otherwise would result from axially disposed shafts and the like. Any convenient peripheral bearing arrangement may be provided capable of supporting the mask against radial or axial motion. As shown in Figs. 6 and 7, the mask 23 may be supported within an annular frame 24 including a ring gear 25 or other suitable means whereby the mask 23 may be positively rotated. Radial bearings 26 and thrust bearings 27 support the mask and gear assembly within a recessed supporting plate 28 having a cover 29 for maintaining the parts in assembled relation. Opening 30 permits the passage of light through the mask 23 and plate 28. The ring gear 25 may be rotated by an idler pinion 31 turned by a driving gear 32 preferably of the same diameter as ring gear 25, all of which are journaled within recessed plate 28. The rotation of driving gear 32 is effected preferably by means of a self-synchronous motor 33 in a manner to be described.

As shown in Fig. 2, a projection lens 34 cooperates with the rotating mask 23 to form the wedge-shaped pattern 15 that may be focused to form an image in a horizontal plane on or slightly above the plotting surface 11. Photoelectric cell 14 is energized by the pattern during each rotation. The photocell impulses may be conveyed to an amplifier 35 and to an indicator 36, such as an electric meter or other signalling device as will more fully appear. Since the instant position of the pattern 15 corresponds with the instant position of the simulated rotating radio beacon, it is apparent that if the indicator 36 is available to the student in the ground trainer, he may be advised of the bearing of the simulated transmitter, and accordingly may follow a homing course. This result is obtained by simulating the modulation employed with conventional rotating radio beacon systems for characterizing instant radio beacon positions. One such rotating radio beacon system keys the radio energy to form Morse code characters designating successive beam positions. Such a system has been adapted successfully to the present device by forming distinctive code characters as the pattern 15 rotates.

As shown in Fig. 2, a convenient arrangement utilizes a code disc 37, e. g., an opaque circular sheet apertured about its periphery as shown in Fig. 8 to provide openings corresponding to dots and dashes. The disc 37 may be mounted for rotation on a turn-table unit 38 as shown in Fig. 1, typically a conventional phonograph drive unit whose speed is adjusted to provide the desired angular velocity for the code disc 37. More frequent indications of position are provided as the speed of the disc is increased, although the speed in turn is limited by the student's ability to receive code and his ability to make connections between indications of position. If the disc 37 is provided with 24 code characters subtending on an average 15° of arc, rotation at three R. P. M. provides 72 code characters per minute, which corresponds to a code speed of less than fifteen words per minute. The student ordinarily hears several characters during each revolution depending upon the angular width of the light beam 15. It has been found that students can receive short bursts of code at a higher rate than they can receive continuously, especially where substantially the same code characters are repeated during ensuing cycles.

With an apertured code disc of the type shown in the present drawings, code signals may be derived by controlling the conduction of current in accordance with the disc apertures. Although this conventionally may be effected through the use of flexible conductive brushes, projectible through the apertures of a dielectric disc, or with cam-operated switches, the signals herein are formed photoelectrically, that is, by projecting a light beam from light source 39 through the apertures to a photoelectric cell 41. The source 39 may comprise a light bulb having a generally linear filament together with a lens system for forming a bright concentrated line on the code wheel.

The resulting code characters are coordinated with the position of the light beam in any suitable manner, several examples being herein disclosed. In Fig. 2 the arrangement utilizes a light source 21 of a type that may be suitably modulated to provide the desired signals. Since the signal is readily receivable by the student as an interrupted audio frequency tone, the source 21 may be modulated at some suitable audio frequency, such as 1000 cycles per second, at intervals determined by the code disc 37. The arrangement shown in Fig. 2 utilizes an audio frequency modulator 42 comprising, for example, a self-excited oscillator keyed by the impulses from photocell 41 after passage through amplifier 43. The signals from the modulator 42 may be fed through a power amplifier 44 of a capacity sufficient to properly modulate the light source 21. The source 21 may be a high intensity gaseous discharge tube, typically a mercury vapor lamp continuously fired by a suitable direct current source from which much of the ripple has been filtered as by a choke coil 45 and condenser 46. A ballast resistor 47 restricts the flow of current through the lamp to within safe operating values. The modulation signal may be applied to the lamp 21 from output transformer 48 of amplifier 44 and through a relatively large coupling condenser 49.

The motions of the beam 15 and of disc 37 are synchronized in any conventional manner, whereby each position of the beam 15 is characterized by a specific group of code signals. Where the beam revolving mechanism and the code forming mechanism are formed as separate units, as shown in Fig. 2, they may be coupled by a suitable mechanical or electrical transmission system 50, such as a flexible shaft or a self-synchronous system comprising a transmitter 51 having an element rotatable with code disc 37, and adapted to control self-synchronous motor 33 by means of cable 52. With the device constructed according to Fig. 2, the mask 23 was found to rotate so freely that no amplifier and servomotor were found necessary, and the gear 32 was driven directly by the rotating element of the motor 33.

In operation, the code disc 37 is set in motion at the desired speed, thereby periodically interrupting the passage of light from the light source 39 to the photocell 41, forming current impulses corresponding to the width and spacing of the apertures defining the respective dots and dashes. The amplified signals key the modulator 42 and produce large amplitude signals of audio frequency in amplifier 44, which are capable of modulating the lamp 21, resulting in an intermittent modulation of the light beam 15 at the desired audio frequency. Since the mask 23 rotates in synchronism with the disc 37, the beam 15 likewise is characteristically modulated for all angular positions. By intercepting the light beam 15 as it passes a reference zone on the repeater 12, the photoelectric cell 14 may be energized to produce signals containing the modulation components. The signals may be passed through cable 53, through blocking condenser 54 to amplifier 35, and thence to the indicator 36. The condenser 54 eliminates the unmodulated component of the light beam 15, and passes the audio frequency signals to the amplifier 35 from which they may be detected, as by earphones 36 located in the trainer G. The photocell 14 may be of the electron multiplier type and may be energized by a power supply 55 which provides the necessary negative and positive voltages for both photocell 14 and amplifier 35.

Instead of modulating the lamp 21 at the audio frequency, the receiving equipment may include an audio frequency modulator 56 of relatively low power whose operation is conditioned upon receiving signals simultaneously from both photoelectric cells 14 and 41. As shown in Fig. 3, this simplified arrangement permits the use of a light source 57 of the simple tungsten filament variety instead of the more expensive and complicated gaseous discharge tube 21, and eliminates the need for light modulation. The light from the source 57 flows continuously, and is formed into a beam as by condensing lenses 22 for evenly illuminating the rotating mask 23. A projection lens forms an image of the desired shape on or near the plotting surface 11, which image may be shaded at the edges as shown in Fig. 8. The code disc 37 may be driven directly from the gear 32, at a rate corresponding to the rotation of mask 23. The code signals may be derived from the disc 37 in any convenient manner, typically by the lamp 39 and photoelectric cell 41 shown in Fig. 3. Amplifiers 43 and 35 are provided for photocells 41 and 14, respectively, to suitably control the modulator 56. The modulator 56 comprises an audio frequency oscillator and may include any desired form of control circuit capable of suppressing the oscillations except when signals are received simultaneously from the amplifiers 43 and 35. Such a conventional arrangement may comprise a thermionic tube 58 having a plurality of control elements, such as control grid 59 and screen grid 61, rendering the tube conductive only when both are properly energized. With such an arrangement the signal output volume may be varied in accordance with the light intensity of the image, so that the bright portions produce a louder signal than do the shaded portions.

Accordingly, when the pattern 15 revolves to a position at which the photocell 14 is energized, modulator 56 will be conditioned for operation by impulses from photocell 41. During the interval in which the image 17 traverses the zone of operation of the photocell 14, the modulator 56 accordingly produces an audio frequency tone signal at intervals defining the code characters determined by the disc 37. Since the code disc 37 and the position of the pattern 15 are synchronized, the code characters received in the phones 36 are varied according to the azimuthal relation of the repeater 12 about the axis 18. With the simplified arrangement of Fig. 3, fewer parts are required and the audio frequency signal may be of lower power.

Fig. 4 discloses a proposal for mechanically modulating the light beam in accordance with the code disc 37. Since the code characters represent respective fixed positions on the plotting surface 11, it is proposed to suspend the disc 37 from an overhead support 62, as by means of a suitable rod 63. The light source or lamp 57 may be focused into a small highly intense spot in the plane of disc 37 as by lens 64. By providing apertures about the periphery of the disc 37 at a radius corresponding to the position of the light spot, the passage of light through the disc 37 may be interrupted periodically to form the code signals. For this purpose the light 57 and lens 64 may be mounted for rotation with respect to the disc 37 within a suitable housing 65 rotated at the desired speed by motor 66 operating through pinion 67 and ring gear 68. The upper end of the housing 65 may be journaled to the rod 63 as by bearing 69 engaging thrust collar 72. The lower end of the housing 65 may be guided by rollers 72 suitably engaging the periphery. Energy to light the lamp 57 may be provided through slip rings 71.

A rotating sector of light may be formed by passing light projecting through the apertures of disc 37 so as to illuminate a wedge-shaped opening 73 in the bottom 74 of housing 65. The light may be distributed over the opening 73 as by a cylindrical lens 75, and the image 17 of the opening may be formed as by projection lens 34 in the manner previously described.

In operation, the light source 57 and all lenses rotate as a unit, forming a rotating sector of light that forms a revolving image at or near the plotting surface 11. The image is modulated in accordance with the apertures in disc 37 and intermittently energizes photocell 14 during a portion of each cycle. The characteristic signals from the photocell 14 actuate amplifier 35, audio oscillator 76 and signal device 36 to produce an indication of the modulation at the moment the pattern 15 passes the photocell.

With the arrangements shown in Figs. 5 and 9, the characteristic signals are indicated as a function of the portion of each period of rotation required for the light pattern to rotate from a predetermined reference position to an operative position relative to repeater 12. Systems of this type accordingly simulate rotating radio beacons operating on the same principle. The light source 57, light collimating means 22 and light pattern revolving means all may be of the same general type shown in Fig. 3 with the exception, of course, that the code wheel 37 is omitted. An additional distinction resides in the shape of the light pattern which may be formed as a ribbon of uniform thickness, obtained with a mask 77 having therein a rectangular opening 78 cooperative with projection lens 34 to form a rectangular image or radial line 79 in the region of the plotting surface 11. The positional repeater 12, photocell 14, and amplifier 35 all may be as previously described. The indicator 36, however, is of a type capable of denoting the azimuthal position of the repeater 12 relative to a reference direction, e. g., north. Preferably, this information is derived as a function of the relative lengths of time required for the pattern to travel from the reference position to the repeater, and from the repeater back to the reference position.

Various simple arrangements may produce this result, two of which are indicated in Figs. 5 and 9. With either arrangement, use is made of a trigger circuit 81, preferably comprising a conventional electronic switch of the Eccles-Jordan type corresponding to a single-pole, double-throw switch reversible by a current impulse, such as is formed at the instant the image 79 excites the photocell 14. Current at constant voltage may be applied during alternate portions of the cycle to the respective terminals of a cross-coil meter 82 having a zero-center pointer 83. The electronic switch 81 thus provides current flow through one coil during the interval that the image 79 progresses from the reference position to the photocell actuating position, and through the other coil during the remainder of the cycle. If the cycle is divided evenly, the pointer 83 remains in the zero center position, whereas if the portions of cycle are unequal, the pointer 83 will be deflected in a direction and to an extent corresponding to the amount of the unbalance.

Fig. 5 illustrates a method of actuating the trigger circuit 81 utilizing a stroboscope 84 actuated by a switch 85 at a position of the gear 32 corresponding to the reference position of the image 79. For example, switch 85 may comprise a pair of leaf spring contacts mutually engageable by a cam 86 when the image 79 occupies a position corresponding to north. The stroboscope accordingly produces a flash of light when the image reaches the reference position, which flash momentarily energizes photocell 14 and actuates the trigger circuit 81 irrespective of the position of the repeater 12. The trigger circuit causes current to flow continuously through one coil of the indicator 36 until the image 79 energizes the photocell 14, at which instant the trigger circuit produces a flow of current through the other coil of the indicator 36. The reading obtained from pointer 83 represents the orientation of the repeater 12 about axis 18, and accordingly indicates the simulated position of the aircraft relative to the simulated transmitting station.

The modification shown in Fig. 9 dispenses with the stroboscope but employs a second photocell 88 permanently positioned on or near the surface 11 at a sufficient distance from the axis 18 as not to interfere with the normal movements of the repeater 12, but in position to be energized by the image 79. The photocell 88 accordingly is energized once during each rotation of the pattern, and may be located to indicate the reference position of the pattern. The signals from photocell 88 may pass to an amplifier 91, and thence to trigger circuit 81. Thus the trigger circuit is actuated alternately by photocells 88 and 14. Each photocell impulse is capable of reversing the flow of current through the indicator, or of switching the current flow to the respective coils thereof where crossed coils are used, so as to produce a pointer deflection corresponding to the ratio between the respective portions of the cycle. The indicator 36 may be calibrated as a compass scale to denote the bearing of the simulated radio transmitter.

Various changes may be made in the apparatus and parts from the various figures of the drawings may be interchanged to provide new combinations. The wedge shaped opening in the mask 23 of Fig. 6 may vary in opacity in a radial direction as well as circumferentially from the central radius, producing an image 17 of the general type shown in Fig. 8. By thus varying the opacity of the opening in mask 23, the light intensity may be varied in a radial direction to simulate the variation of signal strength as a function of the distance between a transmitter and receiver, though this effect is attained somewhat by the normal light distribution. Angular effects introduced by asymmetrical arrangements of the photosensitive surface have been corrected largely in practice by disposing a concave lens 92 in front of the photocell 14 as shown in Fig. 4.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

I claim:

1. A rotating radio beacon system simulator for an aircraft ground trainer of the type having a positional repeater movable over a plotting table to simulate the ground track motion of said trainer, said simulator comprising means for producing a rotating sector of light on said table, means for modulating said sector so as to characterize successive instantaneous rotational positions, a light-sensitive element on said repeater exposed to said rotating sector, and a signal device responsive to said light-sensitive element for signifying the instant position of said sector.

2. A rotating radio beacon system simulator for an aircraft ground trainer of the type having a positional repeater movable over a plotting table to simulate the ground track motion of said trainer, said simulator comprising means for projecting onto said table, a rotating image corresponding in shape to the directivity pattern of the simulated radio beacon, means for modulating said image so as to characterize successive rotational positions, a light-sensitive element on said positional repeater operable by said rotating image, and a signal device responsive to said light-sensitive element.

3. A rotating radio beacon system simulator for an aircraft ground trainer of the type having a positional repeater movable relative to a plotting surface to simulate the ground track motion of said trainer, said simulator comprising a light source above said surface, light collimating means for projecting onto said surface an image, means for revolving said image about an axis passing through one terminus of said image at an angular velocity corresponding to the rotation of the simulated radio beacon, a photosensitive element mounted on said positional repeater for intercepting said image, and means responsive to said photosensitive element for indicating the instant position of said image when intercepted by said photosensitive element.

4. A rotating radio beacon system simulator for an aircraft ground trainer of the type having a positional repeater movable over a plotting table to simulate the ground track motion of said trainer, said simulator comprising means for projecting a ribbon of light toward said table, means for revolving said ribbon of light about an axis extending about an edge of said ribbon at a rate corresponding to the rotation of said beacon, a light-sensitive element mounted on said positional repeater for intercepting said ribbon during at least one portion of each revolution, and means actuated by said light-sensitive element for denoting the instant position of said ribbon when intercepted by said light-sensitive element.

5. A rotating radio beacon system simulator for an aircraft ground trainer of the type having a positional repeater movable over a plotting table to simulate the ground track motion of said trainer, said simulator comprising a light source above said table, means for projecting downwardly toward said table a revolving light pattern simulating the rotation of the radio beacon, light-sensitive means on said repeater in position to intercept said pattern during each revolution thereof, means cooperative with said light sensitive means for deriving a signal representing the orientation of said light pattern when intercepted by said light-sensitive means, and means responsive to said signal for denoting said orientation.

6. A rotating radio beacon system simulator for an aircraft ground trainer of the type having a positional repeater movable relative to a plotting surface to simulate the ground track motion of said trainer, said simulator comprising a light source, means cooperative therewith for producing a revolving pattern of light simulating the rotation of the radio beacon, a photocell device on said repeater for intercepting said light pattern during each revolution thereof, means cooperative with said photocell device for deriving a signal representing the orientation of said light pattern when intercepted by said photocell device, and means responsive to said signal for denoting said orientation.

7. A rotating radio beacon system simulator for a navigation trainer of the type having a simulated craft and controls therefore, and a positional repeater translatable over a reference surface in response to said controls to indicate the simulated path of said craft, said simulator comprising a light source, means cooperative therewith for producing a revolving pattern of light representing the rotating radio beacon, a photocell device on said repeater in position to be exposed to and to be energized by said pattern for a brief interval during each revolution of said pattern, means cooperative with said photocell device for producing a signal during said interval, and means for translating said signal into an indication of the relation of said interval to the full period of revolution.

8. A rotating radio beacon system simulator for a navigation trainer of the type having a simulated craft and controls therefor, and a positional repeater translatable over a reference surface in response to said controls to indicate the simulated path of said craft, said simulator comprising a light source, means cooperative therewith for producing a revolving pattern of light representing the rotating radio beacon, a photocell device on said repeater in position to be exposed to and to be energized by said pattern for a brief interval during each revolution of said pattern, means cooperative with said photocell device for producing a signal during said interval, means for characterizing said signal according to the position of said interval in the period of revolution, and an indicator responsive to said periodic signals.

9. A rotating radio beacon system simulator for a navigation trainer of the type having a simulated craft and controls therefor, and a positional repeater translatable over a reference surface in response to said controls to indicate the simulated path of said craft, said simulator comprising a light source, means cooperative therewith for producing a revolving pattern of light representing the rotating radio beacon, a photocell device on said repeater in position to be exposed to and to be energized by said pattern for a brief interval during each revolution of said pattern, means for modulating said light pattern to characterize its successive positions during a cycle of revolution, and an indicator actuated by said photocell device for denoting the nature of said modulation and accordingly the position of said pattern during each of said intervals.

10. A rotating radio beacon system simulator for a navigation trainer of the type having a simulated craft and controls therefor and a positional repeater translatable over a reference surface in response to said controls to indicate the simulated path of said craft, said simulator comprising a light source, means cooperative therewith for producing a revolving pattern of light representing the rotating radio beacon, photoelectric means for producing a first signal whenever said pattern occupies a predetermined reference position during each cycle of rotation and including a photocell device on said repeater for producing a second signal whenever said pattern is intercepted by said device, and means for indicating the relation of the interval between said signals to the period of revolution.

11. A rotating radio beacon system simulator for a navigation trainer of the type having a simulated craft and controls therefor, and a positional repeater translatable over a reference surface in response to said controls to indicate the simulated path of said craft, said simulator comprising a light source, means cooperative therewith for producing a revolving pattern of light representing the rotating radio beacon, a photocell device on said repeater in position to be exposed to and to be energized by said pattern for a brief interval during each revolution of said pattern, light means for energizing said photocell device whenever said pattern passes through a predetermined reference position during each revolution, and means responsive to said photocell device for indicating the portion of each period of revolution required for said pattern to move from said reference position to a position energizing said photocell device.

12. Combination as claimed in claim 11 wherein said light means comprises a flasher visible to said photocell device at all positions of said repeater, and a flasher actuator operative when said pattern reaches said reference position.

13. A rotating radio beacon system simulator for a navigation trainer of the type having a simulated craft and controls therefor, and a positional repeater translatable over a reference surface in response to said controls to indicate the simulated path of said craft, said simulator comprising a light source, means cooperative therewith for producing a revolving pattern of light representing the rotating radio beacon, a photocell device on said repeater in position to be exposed to and to be energized by said pattern for a brief interval during each revolution of said pattern, a code device for producing code signals designating the respective positions of said pattern, an audio frequency modulator keyed by said code signals for producing audio frequency signals when said photocell device is energized, thereby denoting the instant position of said pattern.

14. Combination as claimed in claim 13, wherein said modulator is operative on said light source to modulate at audio frequency the light forming said pattern.

15. A rotating radio beacon system simulator for a navigation trainer of the type having a simulated craft and controls therefor, and a positional repeater translatable over a reference surface in response to said controls to indicate the simulated path of said craft, said simulator comprising a light source, means cooperative therewith for producing a revolving pattern of light representing the rotating radio beacon, a stationary code plate having apertures therein adapted to modulate said light as said pattern revolves to characterize the successive positions of said pattern, a photocell device on said repeater in position to be energized by said modulated pattern for a brief interval during each revolution of said pattern, and signal device actuated by said photocell output for denoting the instant position of said pattern.

16. Combination as claimed in claim 15 including an audio frequency modulator for tone modulating said photocell output.

GILMAN B. ANDREWS.

REFERENCES CITED

The following references are of record in the file of this patent:

UNITED STATES PATENTS

| Number | Name | Date |
|---|---|---|
| 2,358,793 | Crane | Sept. 26, 1944 |